No. 715,779. Patented Dec. 16, 1902.
T. & J. FRASER.
BALL BEARING.
(Application filed May 21, 1902.)
(No Model.)
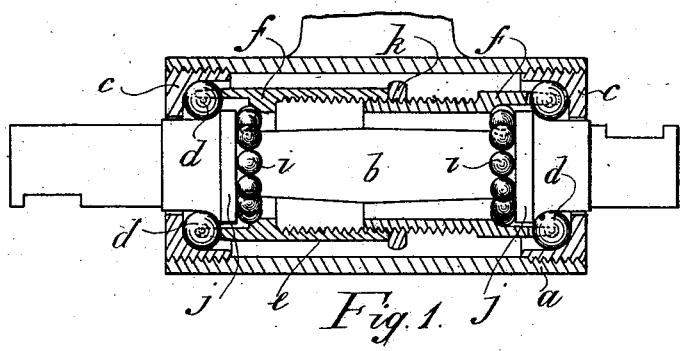
Fig. 1.
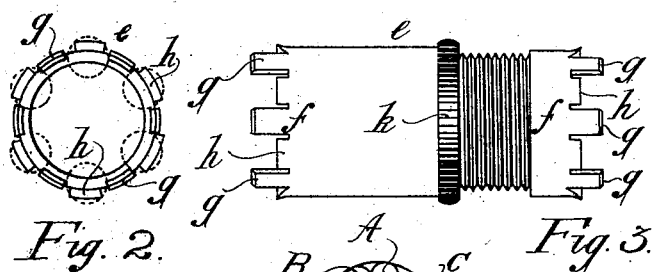
Fig. 2. Fig. 3.
Fig. 6.
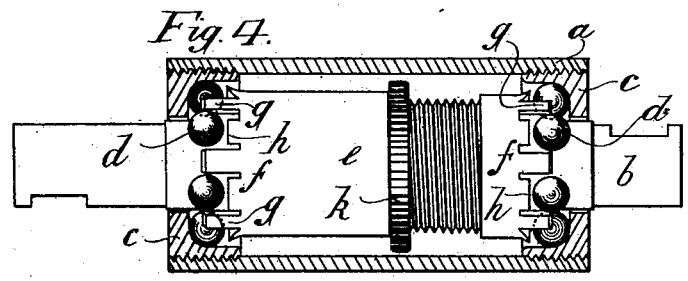
Fig. 4.
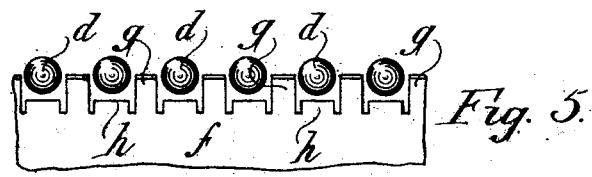
Fig. 5.
Witnesses.
Hiroshi Mori
Ludwig Flum
Inventors.
Thomas Fraser
James Fraser
by B. Singer
Att'y.

UNITED STATES PATENT OFFICE.

THOMAS FRASER AND JAMES FRASER, OF HAMILTON, SCOTLAND.

BALL-BEARING.

SPECIFICATION forming part of Letters Patent No. 715,779, dated December 16, 1902.

Application filed May 21, 1902. Serial No. 108,319. (No model.)

*To all whom it may concern:*

Be it known that we, THOMAS FRASER, master baker, of 11 Saffrow Place, and JAMES FRASER, master shoemaker, of 27 Almada street, Hamilton, county of Lanark, Scotland, subjects of the King of Great Britain, have invented certain new and useful Improvements in Ball-Bearings, of which the following is a specification.

Our invention relates to improvements in ball-bearings, and will be understood from the ensuing description.

By way of example we will describe our invention as applied to the ball-bearings of the bottom bracket of a bicycle, reference being made to the drawings annexed, whereon—

Figure 1 is a longitudinal section taken through the bottom bracket and showing the ball-bearings and crank-axle. Fig. 2 is an end view, and Fig. 3 a side view, of the sleeve. Fig. 4 is a section taken through the bottom bracket, but showing the sleeve and balls in elevation. Fig. 5 is a drawing on Mercator's projection, showing one end of the sleeve with the balls. Fig. 6 is a diagram.

$a$ is the bottom bracket; $b$, the crank-axle; $c$, the usual cups, and $d$ the balls.

The bottom bracket is of the usual construction, and the crank-axle which passes through the same has fitted on it a freely-moving sleeve $e$, which is provided at each end with a cup or ring $f$, having a number of lateral projections or prongs $g$. This sleeve $e$ is cupped at the ends and runs upon small balls $i$, which work on cones $j$ on the axle.

The axle revolves upon the large balls $d$, working between cups and cones in the usual manner, and these balls are isolated from one another by the prongs or projections $g$ at the ends of the freely-moving sleeve. The cups or rings $f$ are provided with small projections or teeth $h$ for the purpose of keeping the balls in place when the parts of the bearing are being fitted together or taken asunder.

The freely-moving sleeve is preferably made in two parts screwed adjustably together and fitted in place on the axle. The parts are held in the adjusted position by a jam-nut $k$.

The two sizes of balls $d$ $i$ used in the bearing are of the kind ordinarily employed in this class of work.

As shown at Figs. 2 and 3, the long prongs or teeth $g$, which project out to the center line of the balls $d$, are bent inward to a slight extent and are beveled at their ends, while the short teeth $h$ are bent outward slightly (see also Fig. 4) and are also beveled at their ends.

As is well known, when the bearing is being adjusted or cleaned the balls are very apt to fall out and be lost, and for this reason it is usual to hold them in position, as far as possible, by means of a stiff lubricant. In the present invention the outwardly-turned teeth $h$, in connection with the long prongs or fingers $g$, form a series of cradles, which retain the balls in position without the necessity of a binding material until the cups are adjusted.

It is to be carefully noted that the large balls $d$ are not jammed between the prongs $g$, but have each a free space to work in, so that they may turn with as little rubbing friction as possible. The sleeve does no actual work, as it merely serves to keep the balls $d$ apart from one another, and thereby prevent the one rubbing against the other and producing a braking action. This braking action will be understood from Fig. 6, where D represents the axle turning in the direction of its arrow and A, B, and C three balls rubbing against one another. Now while the axle D tends to turn the ball A in the direction of its arrow the ball A tends to turn the balls B C in the direction of their arrows and against the direction of movement produced by the action of the axle, thereby setting up a strong braking action and creating much friction and loss of driving power.

Having now fully described our invention, what we claim, and desire to secure by Letters Patent, is—

The combination in a bearing, of balls therein, an axle running on the balls, a sleeve on the axle, cups at the ends of the sleeve, inwardly-bent prongs on the ends of the sleeve, outwardly-bent short teeth on the ends of the sleeve arranged intermediate of the prongs, and means for supporting the sleeve freely in place, substantially as described.

Signed at Glasgow, Scotland, this 22d day of April, 1902.

THOMAS FRASER.
JAMES FRASER.

Witnesses:
HUGH D. FITZPATRICK,
WILLIAM GALL.